(12) United States Patent
Kobori et al.

(10) Patent No.: US 8,725,412 B2
(45) Date of Patent: May 13, 2014

(54) POSITIONING DEVICE

(75) Inventors: Norimasa Kobori, Toyota (JP);
Kazunori Kagawa, Nishikamo-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1090 days.

(21) Appl. No.: 12/305,397

(22) PCT Filed: Jun. 8, 2007

(86) PCT No.: PCT/JP2007/061607
§ 371 (c)(1),
(2), (4) Date: Dec. 18, 2008

(87) PCT Pub. No.: WO2007/148546
PCT Pub. Date: Dec. 27, 2007

(65) Prior Publication Data
US 2010/0004856 A1  Jan. 7, 2010

(30) Foreign Application Priority Data
Jun. 21, 2006  (JP) .................................. 2006-171755

(51) Int. Cl.
*G01C 21/30* (2006.01)
*G01S 19/49* (2010.01)

(52) U.S. Cl.
USPC ........... 701/446; 701/412; 701/448; 701/501; 701/510; 701/536

(58) Field of Classification Search
CPC .... G01C 21/005; G01C 21/165; G01C 21/28; G01C 21/30; G01S 19/48; G01S 19/49; G08G 1/0969
USPC ......... 701/207, 208, 214, 216, 220, 225, 300, 701/412, 468, 469, 470, 480, 483, 494, 498, 701/500, 501, 505–512, 514, 523, 527
See application file for complete search history.

(56) References Cited

U.S. PATENT DOCUMENTS 6,246,960 B1* 6/2001 Lin ................................ 701/214
7,177,737 B2* 2/2007 Karlsson et al. ................ 701/23
(Continued)

FOREIGN PATENT DOCUMENTS

JP  63 302317  12/1988
JP  1 306560   12/1989
(Continued)

OTHER PUBLICATIONS

European Office Action Issued Apr. 5, 2013 in Patent Application No. 07744927.0.

(Continued)

*Primary Examiner* — Behrang Badii
*Assistant Examiner* — Jerrah Edwards
(74) *Attorney, Agent, or Firm* — Oblon, Spivak, McClelland, Maier & Neustadt, L.L.P.

(57) ABSTRACT

A positioning device includes a map data storing unit configured to store map data; autonomous sensors configured to detect behavior information of a moving object; an inertial positioning unit configured to detect an estimated position of the moving object by applying the behavior information detected by the autonomous sensors to positioning results obtained by an electronic navigation positioning unit such as a GPS; a planimetric feature detecting unit configured to detect a planimetric feature located around a road; a planimetric feature position identifying unit configured to identify a position of the planimetric feature; a planimetric feature reference positioning unit configured to estimate a planimetric feature estimated position of the moving object by using the position of the planimetric feature as a reference; and a position estimating unit configured to estimate a position of the moving object by applying the estimated position and the planimetric feature estimated position to a Kalman filter.

9 Claims, 13 Drawing Sheets

(56) References Cited

U.S. PATENT DOCUMENTS

| | | |
|---|---|---|
| 2005/0137786 A1 | 6/2005 | Breed et al. |
| 2006/0106533 A1 | 5/2006 | Hirokawa |
| 2006/0139619 A1* | 6/2006 | Fujii et al. .................... 356/4.03 |
| 2006/0233424 A1* | 10/2006 | Miyajima et al. ............. 382/104 |
| 2009/0005961 A1* | 1/2009 | Grabowski et al. ........... 701/200 |

FOREIGN PATENT DOCUMENTS

| | | |
|---|---|---|
| JP | 7 35560 | 2/1995 |
| JP | 7 239236 | 9/1995 |
| JP | 9 243389 | 9/1997 |
| JP | 10 300493 | 11/1998 |
| JP | 2001 336941 | 12/2001 |
| JP | 2002 213979 | 7/2002 |
| JP | 2004 45227 | 2/2004 |
| WO | WO 2004/059900 A2 | 7/2004 |
| WO | 2005 043081 | 5/2005 |

OTHER PUBLICATIONS

"Least Squares", Wikipedia, http://en.wikipedia.org/w/index.php?title=Least_squares&oldid=54788345, May 23, 2006, 3 pages.

\* cited by examiner

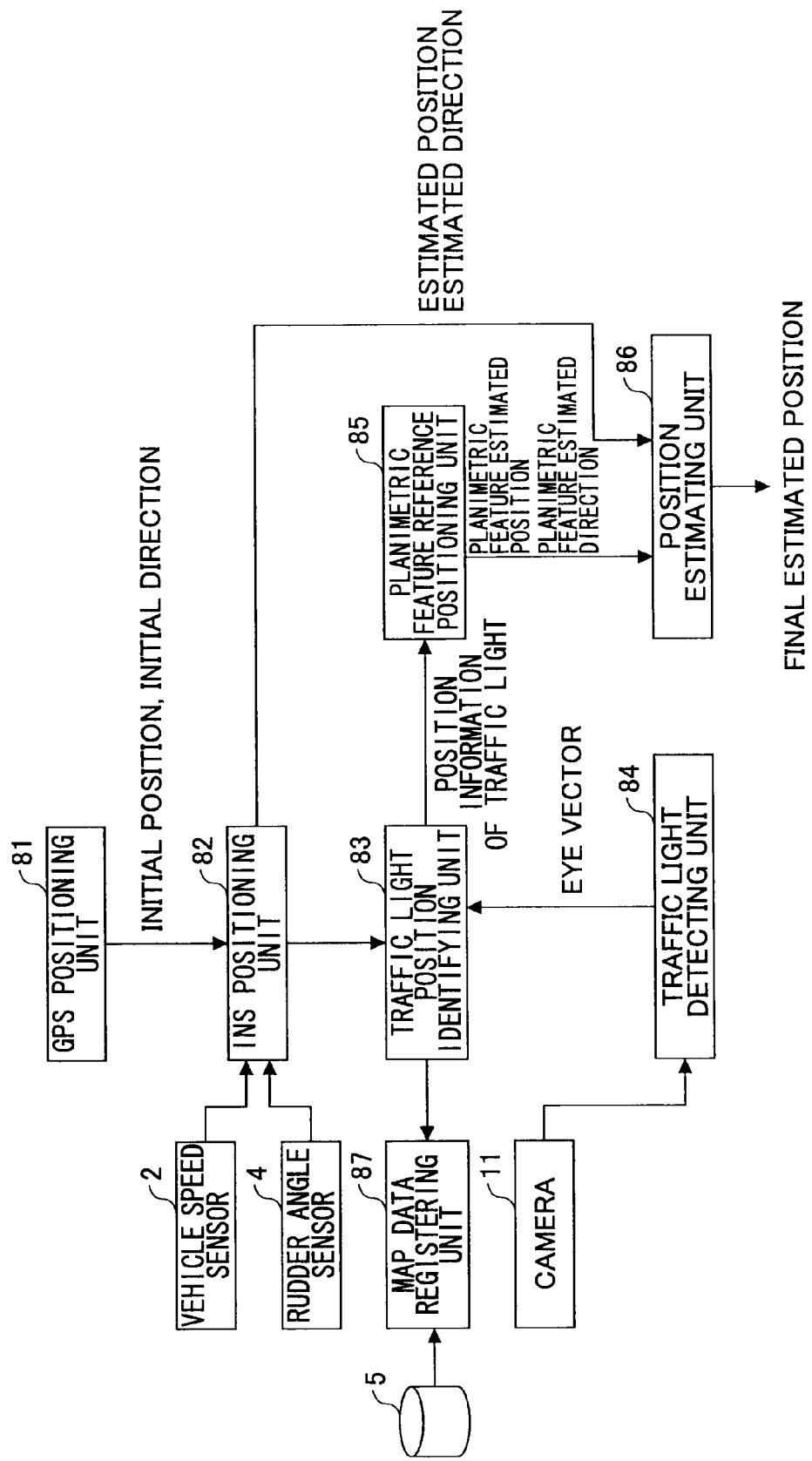

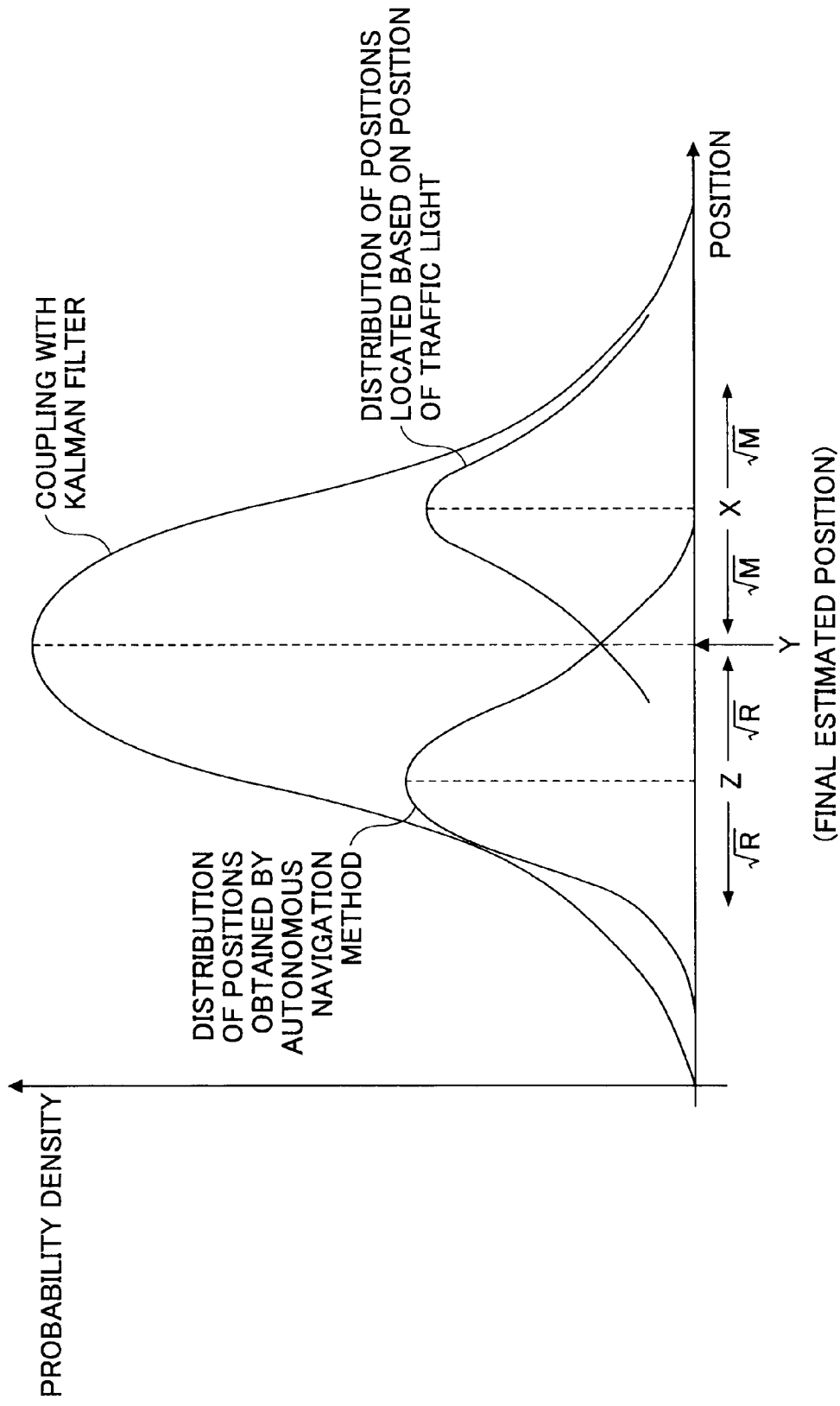

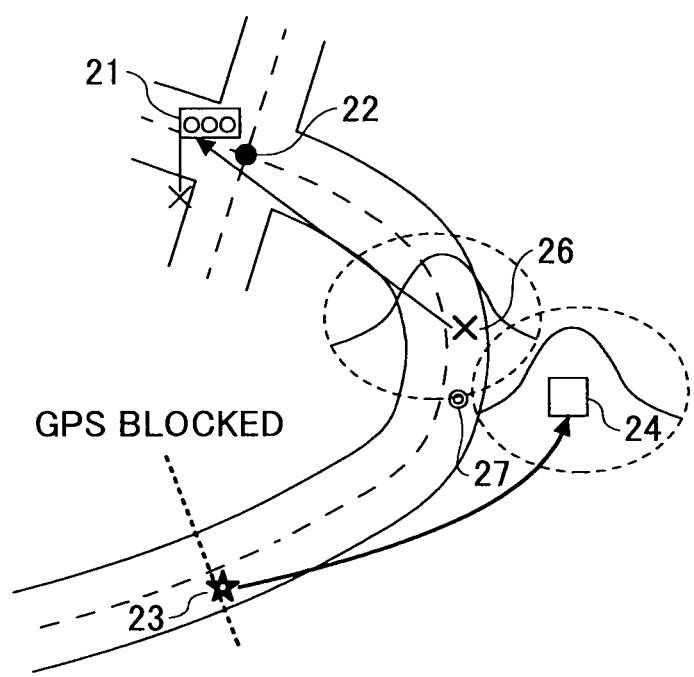

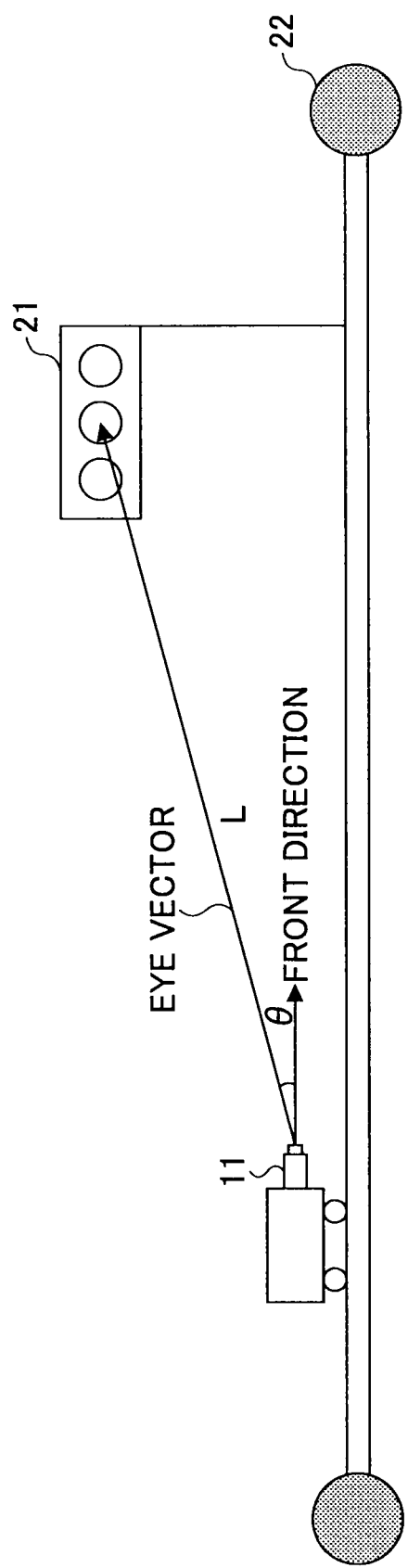

POSITIONING DEVICE

TECHNICAL FIELD

The present invention relates to positioning devices for detecting positions of moving objects, and more particularly to a positioning device for accurately correcting a position of a moving object that has been determined by an autonomous navigation method.

BACKGROUND ART

A navigation system locates the position of the vehicle in which it is installed (hereinafter, "self-vehicle") based on electric waves from GPS (Global Positioning System) satellites, and applies the travel distance and the travel direction with the use of a vehicle speed sensor and a gyro sensor, to accurately estimate the present position of the self-vehicle.

However, when electric waves cannot be received from the GPS satellites, the error in the position located by the autonomous navigation method is amplified along with the passage of time. Thus, the accuracy of the position gradually declines.

Accordingly, various methods have been proposed for correcting the position of the self-vehicle located by the autonomous navigation method. For example, map matching is for correcting the position located by the autonomous navigation method with the use of map data of the navigation system (see, for example, patent document 1). Patent document 1 proposes a method of selecting, from map data, a road whose position and orientation best match the position and orientation detected by the autonomous navigation method, and correcting the detected position and orientation by associating them with the selected road.

However, the map data included in typical commercially available navigation systems is not so accurate. Furthermore, in the map data, the road network is expressed by linear links joining intersections (nodes). Thus, the map data may not match the actual roads. Accordingly, with the map matching method, the position of the self-vehicle may not be sufficiently corrected.

Furthermore, there is proposed a navigation device for calculating the distance between the self-vehicle and an intersection when an intersection symbol such as a traffic light or a crosswalk is detected in an image photographed by a camera, and correcting the position of the self-vehicle in accordance with the calculated distance (see, for example, patent document 2). According to patent document 2, the position of the self-vehicle with respect to the traveling direction can be corrected by calculating the distance between the self-vehicle and the intersection, even while traveling on a long straight road.

Patent Document 1: Japanese Laid-Open Patent Application No. 2002-213979
Patent Document 2: Japanese Laid-Open Patent Application No. H9-243389

DISCLOSURE OF INVENTION

Problems to be Solved by the Invention

However, when the distance between the self-vehicle and the intersection is calculated based on photographed image data, and the calculated distance is directly used to correct the position of the self-vehicle as described in patent document 2, there may be errors in the distance calculated based on photographed image data. Thus, the corrected image may not be accurate. For example, when the self-vehicle is traveling with pitching motions, a considerably erroneous distance may be calculated.

In view of the above problems, an object of the present invention is to provide a positioning device that can correct positioning results obtained by an autonomous navigation method for locating the position of a moving object with improved accuracy.

Means for Solving the Problems

In order to achieve the above objects, a positioning device according to the present invention includes a map data storing unit (for example, the map database 5) configured to store map data; autonomous sensors (for example, the vehicle speed sensor 2 and the yaw rate sensor 3) configured to detect behavior information of a moving object; an inertial positioning unit (for example, the INS positioning unit 82) configured to detect an estimated position of the moving object by applying the behavior information detected by the autonomous sensors to positioning results obtained by an electronic navigation positioning unit such as a GPS; a planimetric feature detecting unit (for example, the traffic light detecting unit 84) configured to detect a planimetric feature located around a road; a planimetric feature position identifying unit (for example, the traffic light position identifying unit 83) configured to identify a position of the planimetric feature; a planimetric feature reference positioning unit configured to estimate a planimetric feature estimated position of the moving object by using the position of the planimetric feature as a reference; and a position estimating unit configured to estimate a position of the moving object by applying the estimated position and the planimetric feature estimated position to a Kalman filter.

Advantageous Effect of the Invention

According to the present invention, a positioning device can be provided, which is capable of correcting positioning results obtained by an autonomous navigation method to locate the position of a moving object with improved accuracy.

BRIEF DESCRIPTION OF THE DRAWINGS

FIG. 2A is a functional block diagram of the positioning device;

FIG. 2B is for describing the operation of a position estimating unit in the positioning device shown in FIG. 2A;

FIG. 3C indicates a final estimated position estimated based on the estimated position and the planimetric feature estimated position;

FIG. 4A illustrates an example of an eye vector;

EXPLANATION OF REFERENCES

Figure 1:
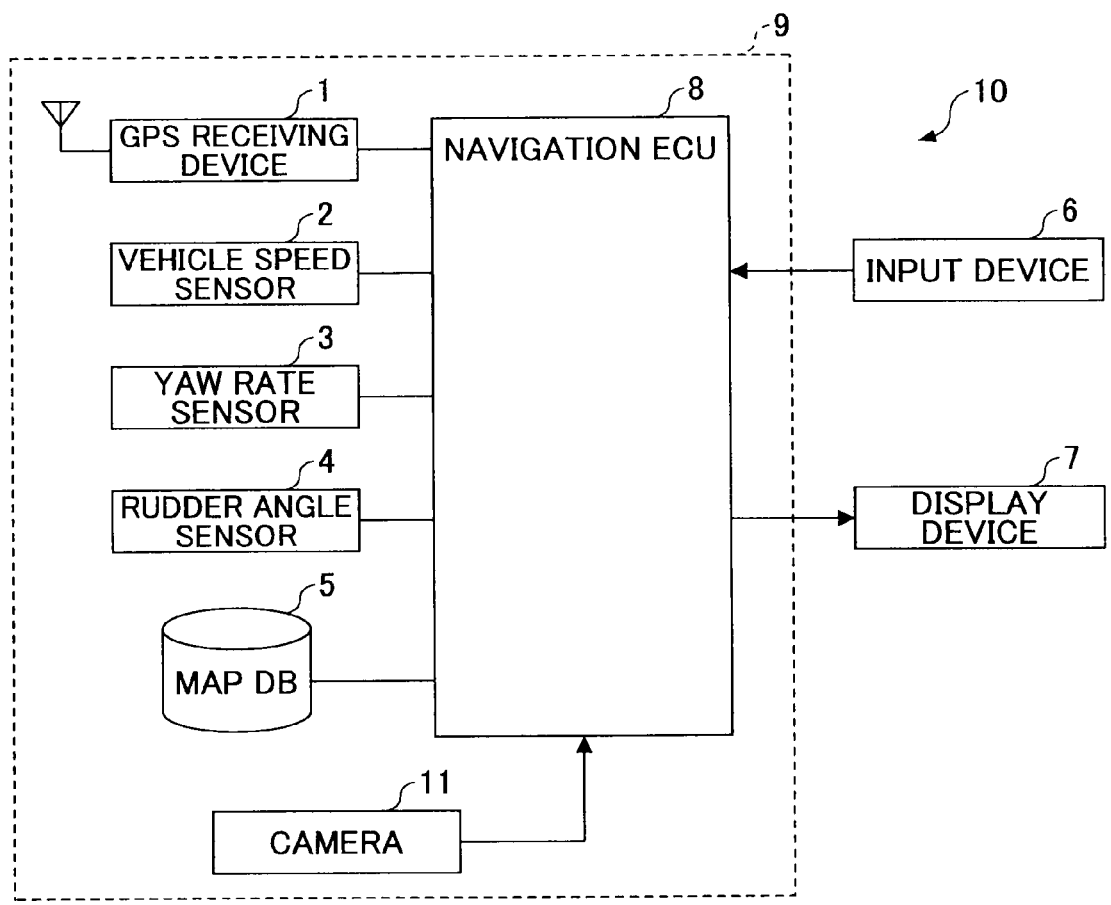
FIG. 1 is a schematic block diagram of a navigation system to which a positioning device is applied.

1 GPS receiving device
2 vehicle speed sensor
3 yaw rate sensor
4 rudder angle sensor
5 map database
6 input device
7 display device
8 navigation ECU
9 positioning device
10 navigation system
11 camera
21 traffic light
22 node of intersection
23 initial position
24 estimated position
25 actual position of self vehicle
26 planimetric feature estimated position
27 final estimated position

BEST MODE FOR CARRYING OUT THE INVENTION

The best mode for carrying out the invention is described based on the following embodiments with reference to the accompanying drawings.

FIG. 1 is a schematic block diagram of a navigation system 10 to which a positioning device 9 according to the present embodiment is applied. The navigation system 10 is controlled by a navigation ECU (Electrical Control Unit) 8. The navigation ECU 8 is a computer including a CPU for executing programs, a storage device for storing programs (hard disk drive, ROM), a RAM for temporarily storing data and programs, an input output device for inputting and outputting data, and a NV (NonVolatile)-RAM, which are connected to each other via a bus.

The units connected to the navigation ECU 8 include a GPS receiving device 1 for receiving electric waves from GPS (Global Positioning System) satellites, a vehicle speed sensor 2 for detecting the speed of the vehicle, a yaw rate sensor 3 (or gyro sensor) for detecting the rotational speed around the gravity center of the vehicle, a rudder angle sensor 4 for detecting the rudder angle of the steering wheel, a map DB (database) 5 for storing map data, an input device 6 for operating the navigation system 10, and a display device 7 such as a liquid crystal device or a HUD (Heads Up Display) for displaying the present position in the map.

The map DB 5 is a table-type database configured by associating the actual road network with nodes (for example, points where roads intersect each other or points indicating predetermined intervals from an intersection) and links (roads connecting the nodes).

The navigation ECU 8 extracts the map data around the detected present position, and displays the map on the display device 7 provided in the vehicle interior at a specified scale size. The navigation ECU 8 displays the present position of the vehicle by superposing it on the map according to need.

Furthermore, when the destination is input from the input device 6 such as a press-down-type keyboard or a remote controller, the navigation ECU 8 searches for the route from the detected present position to the destination by a known route searching method such as a Dijkstra method, displays the route by superposing it on a map, and guides the driver along the route by giving directions at intersections to turn left or right.

A camera 11 is fixed at the front part of the vehicle, more preferably on the backside of the rearview mirror or at the top of the windshield, in order to photograph a predetermined range in front of the vehicle.

The camera 11 has a photoelectric conversion element such as a CCD (Charge Coupled Device) or a CMOS (Complementary Metal Oxide Semiconductor), and performs photoelectric conversion on the incident light with a photoelectric conversion element, reads and amplifies the accumulated electric charge as a voltage to perform A/D conversion, and then converts it into a digital image having predetermined brightness grayscale levels (for example, 256 levels of grayscale values).

The camera 11 preferably has a function of obtaining distance information, in order to detect the positional relationship between the self-vehicle and artificial planimetric features (traffic lights, signs, paint of crosswalks, electric utility poles, etc.) located along a road at intersections, etc. Accordingly, examples of the camera 11 are a stereo camera including two cameras and a motion stereo camera for performing stereoscopic viewing with time-series imagery obtained with a single camera mounted on a moving object. Another example of the camera 11 is one that obtains the distance by radiating near-infrared rays from an LED (light-emitting diode) at predetermined time intervals and measuring the time until the photoelectric conversion element receives the reflected rays.

The CPU of the navigation ECU 8 executes a program stored in the storage device to implement the positioning operation described in the present embodiment. FIG. 2A is a functional block diagram of the positioning device 9. The positioning device 9 includes a GPS positioning unit 81 for locating the position of the self-vehicle by the autonomous navigation method, an INS (Inertial Navigation Sensor) positioning unit 82 for locating the position of the self-vehicle by the autonomous navigation method with the use of autonomous sensors (vehicle speed sensor 2, rudder angle sensor 4), a traffic light detecting unit 84 for detecting planimetric features such as traffic lights based on image data photographed by the camera 11, a traffic light position identifying unit 83 for identifying the position of a detected traffic light, a planimetric feature reference positioning unit 85 for locating the position of the self-vehicle based on the position of the traffic light, a position estimating unit 86 for outputting the maximum likelihood value of the position of the self-vehicle with a Kalman filter, and a map data registering unit 87 for registering, in the map DB 5, the position information of a planimetric feature such as a traffic light identified by the traffic light position identifying unit 83, in association with the planimetric feature. Hereinafter, a description is given of the positioning device 9 shown in FIG. 2A.

The positioning device 9 can perform accurate positioning by correcting the position of the vehicle located by the autonomous navigation method, even when it is difficult to capture the GPS satellite waves or the reliability of the GPS positioning operation is degraded. FIG. 2B is for describing the operation of the position estimating unit 86 in the positioning device shown in FIG. 2A.

An outline is described with reference to FIG. 2B. When the GPS waves are blocked, the positioning device 9 uses a Kalman filter for coupling the position located by the autonomous navigation method and the position located based on an eye vector to a planimetric feature such as a traffic light, in order to accurately estimate a position Y.

The GPS positioning unit 81 locates the position of the self-vehicle based on electric waves from the GPS satellites by a known method. The GPS positioning unit 81 selects four or more GPS satellites that are within a predetermined elevation angle from the present position of the vehicle from among plural GPS satellites rotating along predetermined orbits, and receives electric waves from the selected GPS satellites. The GPS positioning unit 81 calculates the time when the electric wave will be received, and calculates the distance to the corresponding GPS satellite based on the receiving time and the light velocity c. Accordingly, the point at which the three distances between the GPS satellites and the self-vehicle intersect each other is determined as the position of the self-vehicle.

The positioning device 9 locates the position of the self-vehicle at every predetermined time interval, while receiving GPS waves. When the GPS waves are blocked, the position most recently determined is set to be the initial position and the traveling direction at this point is determined to be the initial direction. Then, a positioning operation starts by performing an autonomous navigation method of applying traveling distances and traveling directions to the initial position and direction.

Figure 3A:
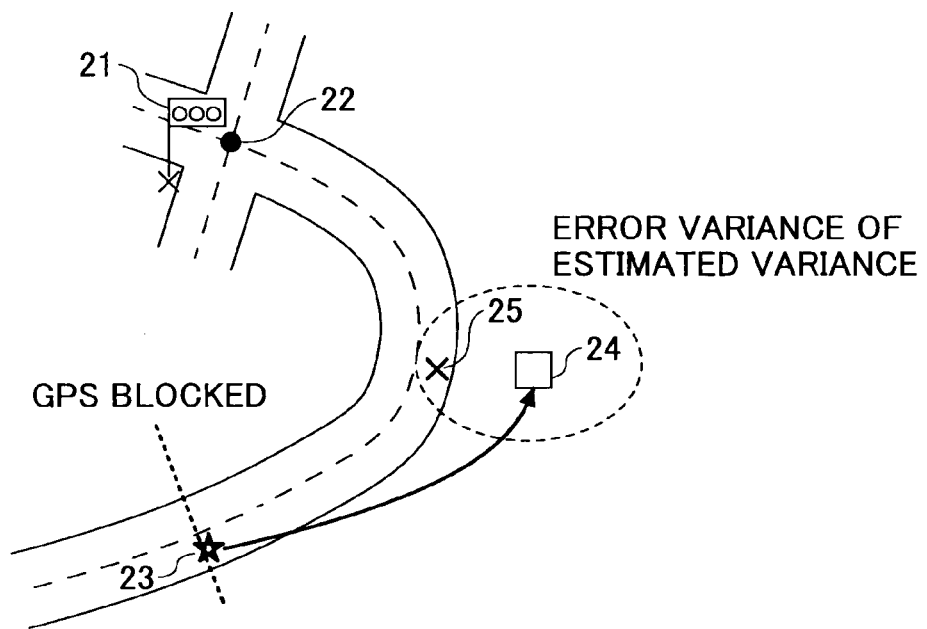
FIG. 3A illustrates the positional relationship between a traffic light and a self-vehicle.

FIG. 3A illustrates a position detected by the autonomous navigation method. The self-vehicle is traveling toward the intersection, and the GPS waves are blocked at an initial position 23. A node 22 of the intersection is extracted from the map DB 5, and therefore the position of the node 22 is already known.

The INS positioning unit 82 detects the vehicle speed from the vehicle speed sensor 2 and the rudder angle from the rudder angle sensor 4, applies the traveling distance and traveling direction to the initial position 23 and the initial direction, to estimate the position and direction by the autonomous navigation method (hereinafter, "estimated position" and "estimated direction"). The autonomous sensor for detecting the traveling direction of the self-vehicle may be a gyro sensor or a yaw rate sensor.

Furthermore, knowing the error variance of the estimated position is necessary for applying the Kalman filter. The errors of the vehicle speed sensor 2 and the rudder angle sensor 4 are already known according to the speed and the time that the GPS waves are blocked. Thus, the error variance of an estimated position 24 obtained by applying the distance based on these errors is already known. In FIG. 3A, the error variance of the estimated position 24 is indicated by an oval with dashed lines. At this time (time t), the self-vehicle is at an actual position 25.

While the position is being detected by the autonomous navigation method, the traffic light detecting unit 84 detects the traffic light from the image data photographed by the camera 11. The detected position of the traffic light is used to estimate the position of the self-vehicle. A traffic light 21 can be any planimetric feature as long as it can be used for estimating the position of the self-vehicle, such as a sign or an electric utility pole.

The traffic light detecting unit 84 detects the traffic light by a pattern matching method with the use of a reference pattern in which the position of the traffic light is stored beforehand. The traffic light detecting unit 84 scans the pixel values of the image data (brightness) in the horizontal direction and the vertical direction, and extracts an edge portion having a gradient of more than or equal to a predetermined level. Adjacent edge portions are joined to extract the outline of the photograph object, and pattern matching is performed on the extracted outline with the use of the reference pattern. In the case of a traffic light, the outline is a rectangle, and therefore pattern matching can be performed only on the edge portions corresponding to the outline of a predetermined horizontal to vertical ratio. The traffic light detecting unit 84 compares the brightness of each pixel of a region surrounded by the outline with that of the reference pattern. When the brightness values correlate with each other by more than a predetermined level, it is determined that the traffic light is being photographed, and the traffic light is detected.

Upon detecting the traffic light, the traffic light detecting unit 84 extracts distance information from the image data. As described above, the distance information is extracted from the parallax between two sets of image data, for example. From a pair of stereo images photographed by the camera 11, a part of the same photograph object (traffic light) is extracted. The same points of the traffic light included in the pair of stereo images are associated with each other, and the displacement amount (parallax) between the associated points is obtained, thereby calculating the distance between the self-vehicle and the traffic light. That is, when the pair of image data items are superposed, the traffic light appears to be displaced in the horizontal direction due to the parallax. The position where the images best overlap is obtained by shifting one of the images by one pixel at a time, based on the correlation between the pixel values. Assuming that the number of shifted pixels is n, the focal length of the lens is f, the distance between the optical axes is m, and the pixel pitch is d, the distance L between the self-vehicle and the photograph object is calculated by a relational expression of $L=(f \cdot m)/(n \cdot d)$. In this expression, $(n \cdot d)$ represents the parallax.

The traffic light detecting unit 84 calculates the eye vector joining the detected traffic light and the self-vehicle. Assuming that the direction in which the camera 11 is fixed (the front direction of the camera 11) corresponds to zero, the direction $\theta$ of the eye vector is obtained based on the distance L between the self-vehicle and the position where the traffic light is photographed in the photoelectric conversion element. FIG. 4A illustrates an example of the eye vector.

The map DB 5 stores the coordinates of nodes, information indicating whether there are intersections, and the types of intersections. In addition, the map DB 5 may store information indicating whether a traffic light is placed and coordinates expressing where the traffic light is placed (hereinafter, "traffic light coordinates"). When traffic light coordinates are stored, the absolute position of the traffic light is already determined, and therefore the traffic light coordinates of the detected traffic light can be acquired.

However, when plural traffic lights are photographed in one image data item, or when traffic light coordinates are not stored in the map DB 5, it is necessary to identify the position of the traffic light from the image data in which the traffic light has been detected.

The traffic light position identifying unit 83 according to the present embodiment identifies the position of the traffic light with the use of one of i) traffic light coordinates, ii) a least squares method, and iii) a least squares method to which a maximum grade method is applied.

Figure 4B:
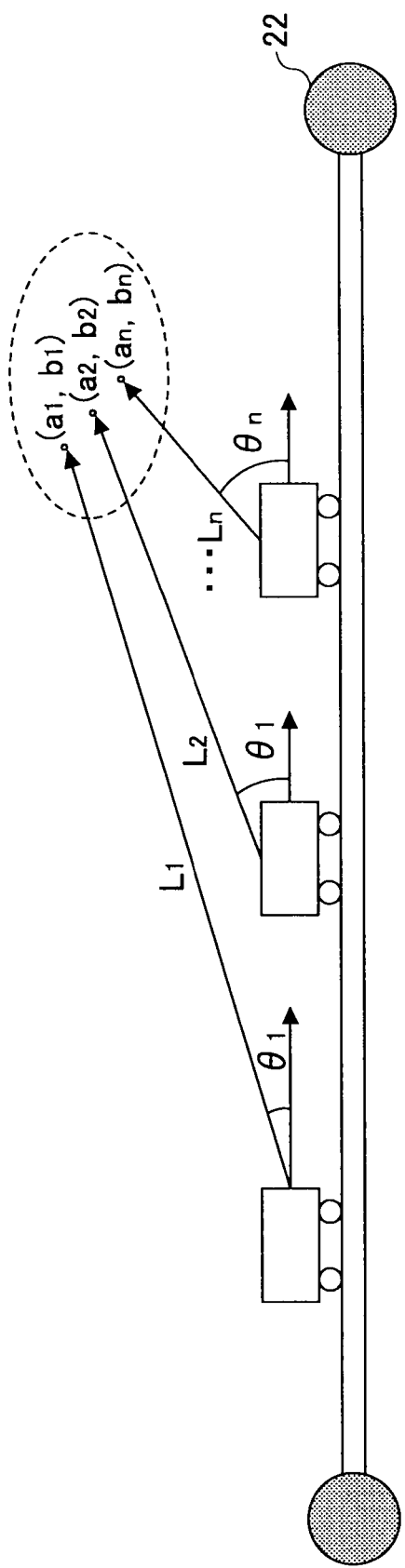
FIG. 4B illustrates an example of identifying the position of the traffic light by a least squares method.

FIG. 4B illustrates an example of identifying the position of the traffic light by the least squares method. Every time a traffic light is detected, distances L1, L2, . . . Ln are obtained, and similarly, directions of the eye vector θ1, θ2, . . . θn are obtained. Thus, an assembly of points (a, b) can be obtained from sets (L, θ) each including a distance from the self-vehicle and a direction of the eye vector. The positions of the traffic lights in the height direction are substantially equal, and therefore (a, b) are coordinates of a plane that is parallel to the road.

For example, if a linear model is determined as $a_i \equiv k_0 + k_1 L_i + k_2 \theta_i$, $b_i \equiv m_0 + m_1 L_i + m_2 \theta_i$, the square error $\epsilon 2k(k0, k1, k2)$, $\epsilon 2m(m0, m1, m2)$ is as follows. The sample size is "N", and "i" is a value from 1 through N.

$$\epsilon^2_k(k_0, k_1, k_2) = (1/N)\Sigma\{a_i - (k_0 + k_1 L_i + k_2 \theta_i)\}^2$$

$$\epsilon^2_m(m_0, m_1, m_2) = (1/N)\Sigma\{b_i - (m_0 + m_1 L_i + m_2 \theta_i)\}^2$$

$\epsilon^2_k$ is differentiated partially with respect to $k_0$, $k_1$, $k_2$, and $(k_0, k_1, k_2)$ can be obtained from $a\epsilon^2_k/ak_0 = 0$, $a\epsilon^2_k/ak_1 = 0$, $a\epsilon^2_k/ak_2 = 0$. "a" in a ϵ/ak represents the partial differentiation. "$b_i$" can be obtained in a similar manner.

The above linear model is one example. The relationship of (a, b) and (L, θ) can be nonlinear. One example is ai=f(L)+g(θ).

Figure 3B:
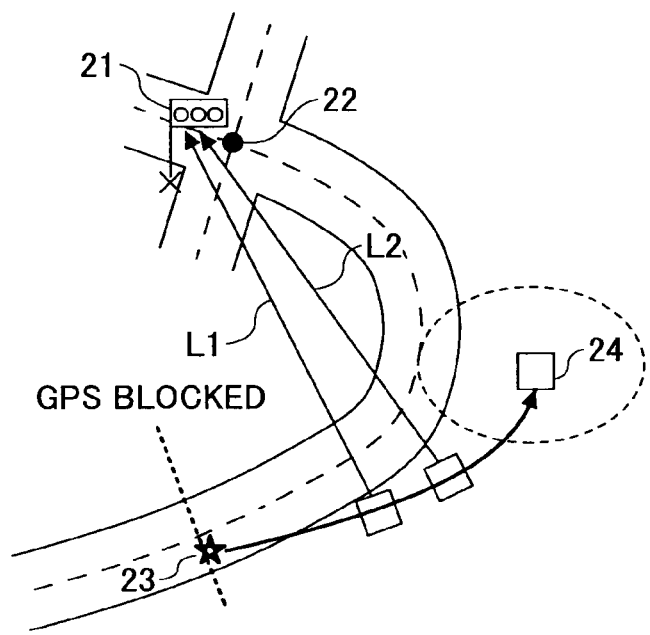
FIG. 3B illustrates the position of the traffic light identified by a least squares method.

FIG. 3B illustrates the position of the traffic light 21 identified by a least squares method. The position of the traffic light 21 can be identified based on the distance L from the self-vehicle to the traffic light detected until the vehicle reaches the estimated position 24 at the time t, and the direction of the eye vector θ.

In order to obtain preferable computation results by the least squares method, the sample size N needs to be four or more. Thus, the traffic light position identifying unit 83 does not identify the position of the traffic light when the sample size N is less than four, i.e., when the number of times that the traffic signal is detected and the eye vector is calculated is less than four. Accordingly, it is possible to prevent the accuracy in locating the position of the self-vehicle from declining when the Kalman filter is applied. In this case, the positioning device 9 outputs the estimated position 24 and the estimated direction.

The concept of the least squares method is to set "the total sum of the square errors acquired each time the distance between the position of the vehicle and the position of the traffic signal is measured" as the evaluation function, and to obtain the position of the traffic light that minimizes this evaluation function. A description is given of a method of obtaining the position of the traffic light with which the evaluation function is minimized based on the slope of the evaluation function, by applying the maximum grade method.

Figure 5A:
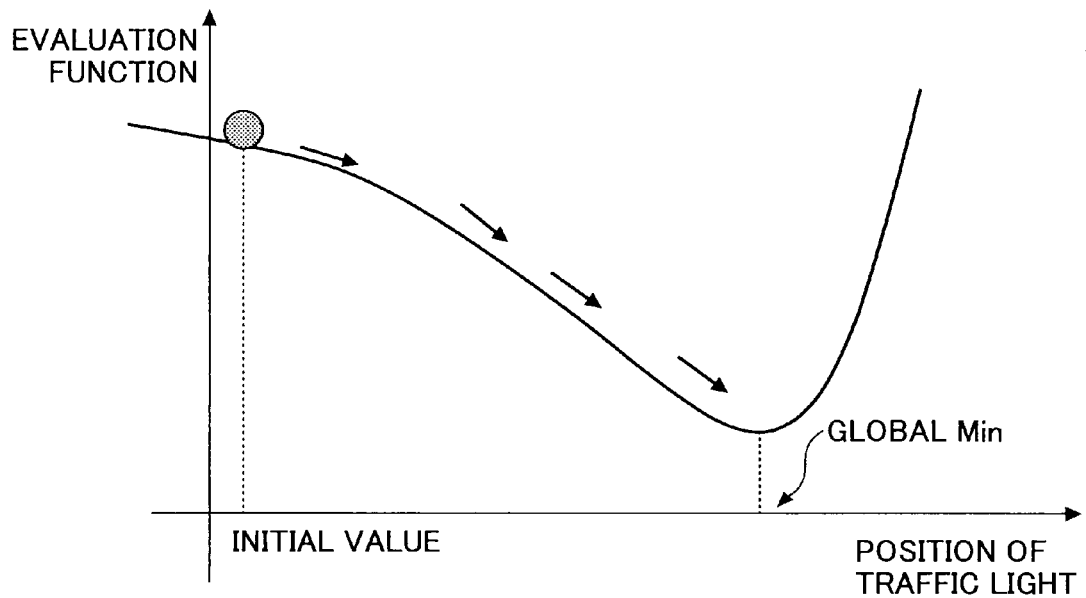
FIG. 5A illustrates the relationship between the evaluation function and the positions of the traffic lights when the sample size is sufficiently large.

FIG. 5A illustrates the relationship between the evaluation function and the positions of the traffic lights. The value of the evaluation function fluctuates according to the calculated position of the traffic light, and there is a minimum value of the evaluation function. The maximum grade method starts with an appropriate initial value, and the parameter value is gradually changed in the direction opposite to that of the differential value to approach an optimum parameter.

When the least squares method is performed, the evaluation function corresponds to the least squares error, and therefore the partial differentiation of each parameter is calculated.

For example, the following formulae are used as the updating formulae for parameters $k_0$, $k_1$, $k_2$.

$$k_0^{(j+1)} = k_0^{(j)} + 2 \cdot (1/N)\Sigma\{(a_i - (k_0 + k_1 L_i + k_2 \theta_i)\}$$

$$k_1^{(j+1)} = k_1^{(j)} + 2 \cdot (1/N)\Sigma\{(a_i - (k_0 + k_1 L_i + k_2 \theta_i)\}L_i$$

$$k_2^{(j+1)} = k_2^{(j)} + 2 \cdot (1/N)\Sigma\{(a_i - (k_0 + k_1 L_i + k_2 \theta_i)\}\theta_i$$

The subscript "j" starts with 0, and when $k_0^{(j+1)}$ becomes minimum, the evaluation function becomes minimum at this parameter, and therefore the calculation is aborted. It can be determined whether the evaluation function has become minimum depending on whether the differential value (slope) has become substantially zero. In this manner, the parameters $k_0$, $k_1$, $k_2$ can be achieved. In FIG. 5A, the position of the traffic light at which the evaluation function becomes minimum is indicated as global min.

Figure 5B:
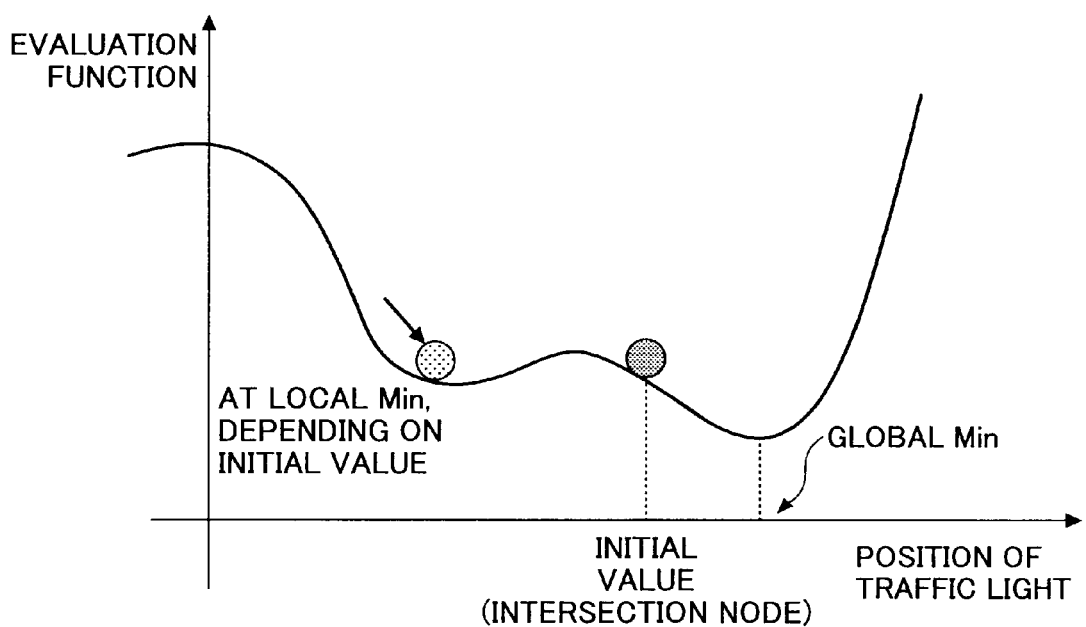
FIG. 5B illustrates the relationship between the evaluation function and the positions of the traffic lights when the sample size is small.

In the maximum grade method, $k_0^{(0)}$, etc., when j=0 corresponds to the initial value of each parameter. The accuracy of the minimum value depends on this initial value. FIG. 5B illustrates the relationship between the evaluation function and the positions of the traffic light. In this example, there are plural minimum values. As shown in FIG. 5B, global min indicates the position of the traffic light corresponding to the minimum value on the right side. Depending on the initial value, the position of the traffic light corresponding to the minimum value may be indicated by local min on the left side. Furthermore, when the sample size N is small, the value of the evaluation function is likely to diverge.

However, it can be estimated that the traffic light is located at the intersection. Therefore, a value obtained from the node position of the intersection is set as the initial value for the maximum grade method. This is the same as setting the node position as the initial value. By performing such a process, the position of the traffic light corresponding to global min can be detected, even when the sample size N is small.

In the above manner, the position of the traffic light 21 shown in FIG. 3B can be identified.

Returning to FIG. 2A, the planimetric feature reference positioning unit 85 locates the position of the self-vehicle (hereinafter, "planimetric feature estimated position" and "planimetric feature estimated direction") based on the position of the traffic light 21 acquired with the use of one of i) traffic light coordinates, ii) a least squares method, and iii) a least squares method to which a maximum grade method is applied.

FIG. 3C indicates a planimetric feature estimated position 26 of the self-vehicle located based on the distance L from the position of the traffic light and the eye vector direction θ. The planimetric feature reference positioning unit 85 calculates the planimetric feature estimated position 26 and the planimetric feature estimated direction based on the distance L and the eye vector direction θ at the time t.

When the i) traffic light coordinates are used, the error variance of the planimetric feature estimated position 26 can be obtained from an error ΔL of the distance L and an error Δθ of the eye vector θ. When the least squares method of ii) or iii) is used to identify the position of the traffic light, in addition to the process of i), it is possible to obtain the error variance from errors found in the course of calculating the parameters. In FIG. 3C, the error variance of the planimetric feature estimated position 26 is indicated by an oval with dashed lines.

The position estimating unit 86 uses a Kalman filter for coupling the estimated position 24 and the planimetric feature estimated position 26, and outputs the final estimated position and direction of the self-vehicle having the highest probability.

FIG. 3C indicates a final estimated position 27 that is estimated based on the estimated position 24 and the planimetric feature estimated position 26. In FIG. 3C, each error variance is indicated with convexities at the estimated position 24 and the planimetric feature estimated position 26. However, the variance actually extends in a three-dimensional manner. FIG. 2B illustrates how a maximum likelihood value Y is estimated with the dispersions and the Kalman filter.

In the Kalman filter, when the status of each system is separately estimated, the status having the highest probability (status where the product of the distribution is maximum) is estimated based on the distribution of the probability density of the statuses. Accordingly, by coupling the two sets of positioning information with the use of the Kalman filter, it is possible to estimate the final estimated position 27 where the self-vehicle is most probably located.

In the Kalman filter, when the estimated position 24 is a Z vector and the planimetric feature estimated position 26 is an X vector, Z and X are assumed to have the following relationship with the use of a known observation equation.

$$Z-HX=0$$

When the error variance of Z is R and the error variance of X is M, the error variance of the maximum likelihood value Y corresponding to the final estimated position 27 is analytically obtained as $A=(M^{-1}+H^{t}R^{-1}H)^{-1}$. Furthermore, with the Kalman filter, the maximum likelihood value Y is obtained by the following formula:

$$Y(i)=X(i-1)+K(i)\cdot\{Z(i)-H(i)\cdot X(i-1)\}$$

where the subscript i represents the number of times of observing the position of the self-vehicle, t represents the transposed matrix, and −1 represents the inverse matrix. K(i) is the Kalman gain matrix, which can be expressed as follows.

$$K(i) = A(i) \cdot H^t R^{-1}_i$$
$$A(i) = (M^{-1} + H^t R^{-1} H)^{-1}$$
$$= M(i) - M(i) \cdot H(i)^t \{H(i)M(i)H(i)^t + R(i)\}^{-1} H(i)M(i)$$

The error variance of the estimated position 24 and the error variance of the planimetric feature estimated position 26 are already obtained, and therefore the position estimating unit 86 outputs the final estimated position 27 based on these formulae. The direction of the self-vehicle can be obtained in the same manner.

Figure 6:
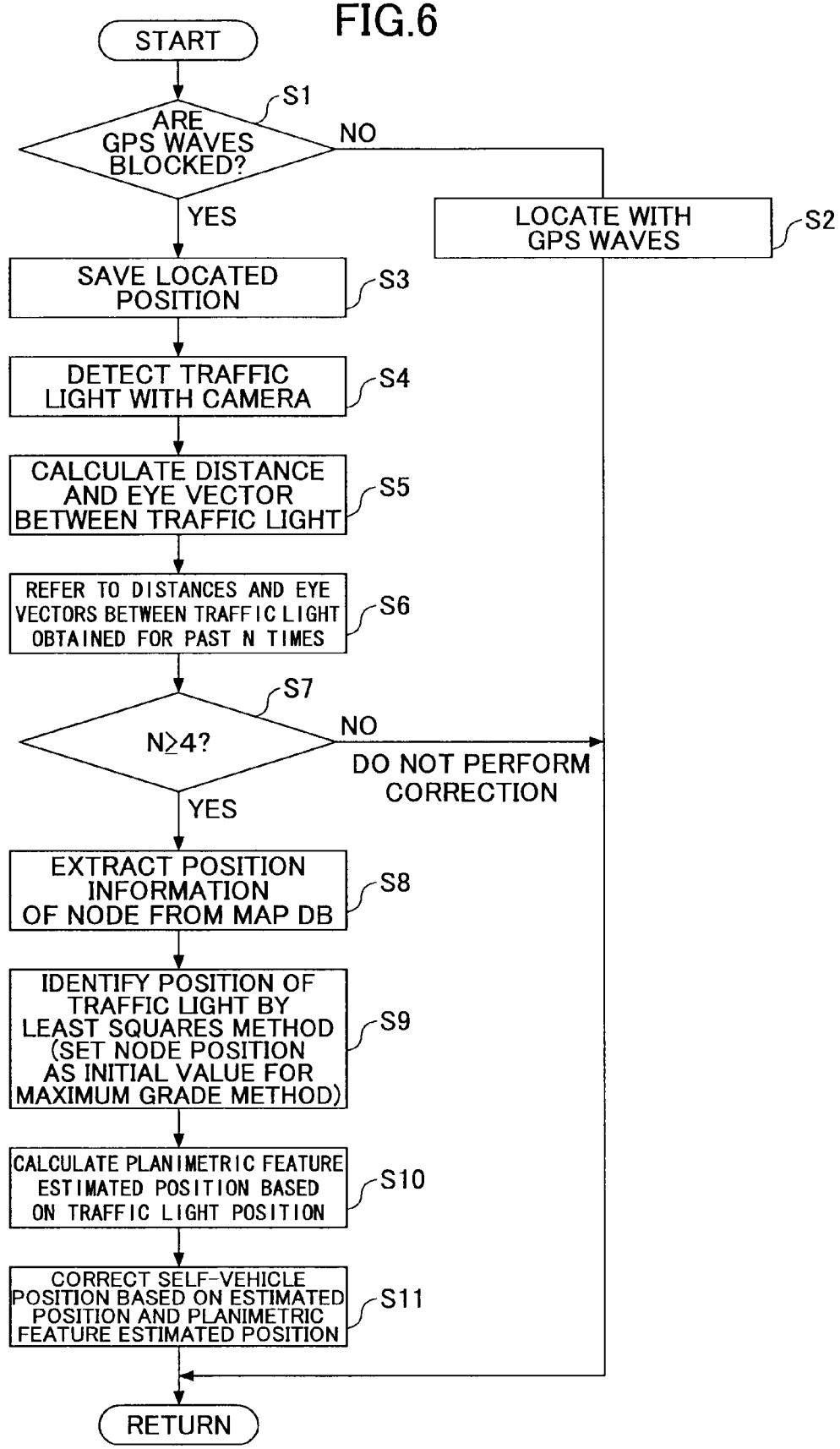
FIG. 6 is a flowchart of procedures performed by the positioning device for estimating the position of the self-vehicle with a positioning operation based on the autonomous navigation method and the position of the traffic light.

FIG. 6 is a flowchart of procedures performed by the positioning device 9 for estimating the position of the self-vehicle with a positioning operation based on the autonomous navigation method and the position of the traffic light.

The positioning device 9 determines whether the GPS waves have been blocked at each positioning interval of the GPS positioning unit 81, for example (step S1). When the GPS waves are not blocked (No in step S1), the position of the self-vehicle is located by using the GPS waves (step S2).

When the GPS waves are blocked (Yes in step S1), the GPS positioning unit 81 stores the initial position and the initial direction in the storage device of the navigation ECU 8, and the INS positioning unit 82 applies traveling distances and traveling directions to the initial position 23 and the initial direction based on the vehicle speed and the rudder angle, to estimate the estimated position 24 and the estimated direction by the autonomous navigation method (step S3). Based on the errors, etc., of the vehicle speed sensor 2 and the rudder angle sensor 4, the INS positioning unit 82 calculates the dispersions of the accumulated estimated position 24 and estimated direction.

The traffic light detecting unit 84 repeatedly detects the traffic light 21 in parallel with the positioning operation performed by the autonomous navigation method (step S4). When the traffic light is detected, the traffic light detecting unit 84 extracts distance information from a pair of image data items. Furthermore, the traffic light detecting unit 84 calculates the eye vector joining the detected traffic light and the self-vehicle (step S5).

Next, the traffic light position identifying unit 83 refers to the distances and the eye vectors between the self-vehicle and the traffic light which have been obtained for the past N times (step S6).

As described above, when N is small, the accuracy of the position of the traffic light identified by the least squares method declines. Thus, the traffic light position identifying unit 83 determines whether N is four or more (step S7). When the distance and eye vector have not been obtained for four or more times (No in step S7), the positioning device 9 outputs a positioning result obtained by the autonomous navigation method.

When the distance and eye vector have been obtained for four or more times (Yes in step S7), the traffic light position identifying unit 83 extracts, from the map DB 5, the position information of the node of the intersection located in the traveling direction (step S8).

Next, the traffic light position identifying unit 83 calculates the position of the traffic light by the least squares method (step S9). When the least squares method is applied, the maximum grade method is performed to use the position information of the node as the initial value. Accordingly, the position of the traffic light can be identified.

Next, the planimetric feature reference positioning unit 85 calculates the planimetric feature estimated position 26 and the estimated planimetric direction from the distance L and the eye vector direction θ, using the identified position of the traffic light as the origin (step S10).

Next, the position estimating unit 86 uses a Kalman filter for coupling the estimated position 24 and the planimetric feature estimated position 26, and outputs the final estimated position 27 (step S11).

Figure 7:
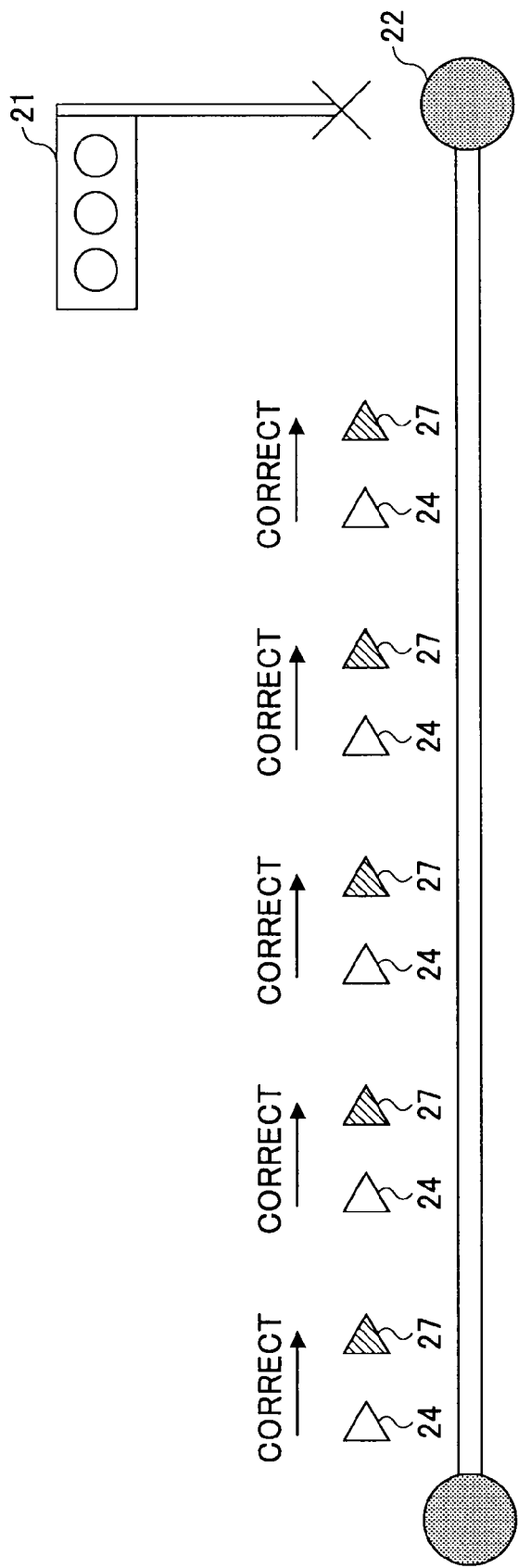
FIG. 7 illustrates an example of correcting the estimated position located by the autonomous navigation method to obtain the final estimated position.

FIG. 7 illustrates an example of correcting the estimated position 24 located by the autonomous navigation method to obtain the final estimated position 27. FIG. 7 illustrates how the estimated position is corrected by the autonomous navigation method every time the final estimated position 27 is output. In the present embodiment, the position of the self-vehicle is located by using as a reference the position of the traffic light located in the traveling direction, and the position located by the autonomous navigation method is corrected. Therefore, the position particularly in the traveling direction can be accurately corrected.

Figure 8A:
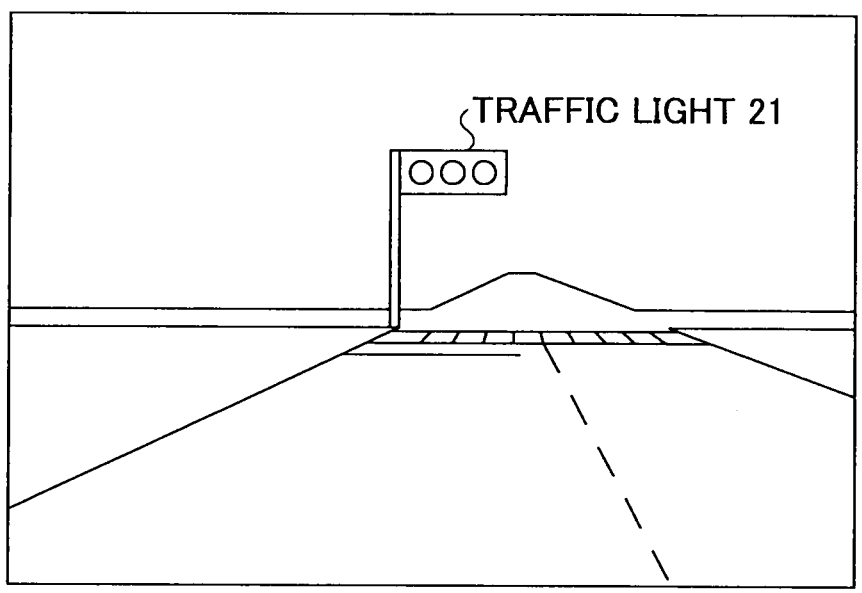
FIG. 8A illustrates positioning results obtained by the positioning device in a state where the GPS waves are blocked along an ordinary road.

FIG. 8 illustrates positioning results obtained by the positioning device 9 in a state where the GPS waves are blocked in an ordinary road. FIG. 8A shows image data photographed by the camera 11. In FIG. 8A, the traffic light 21 is detected at the top part of the image data.

Figure 8B:
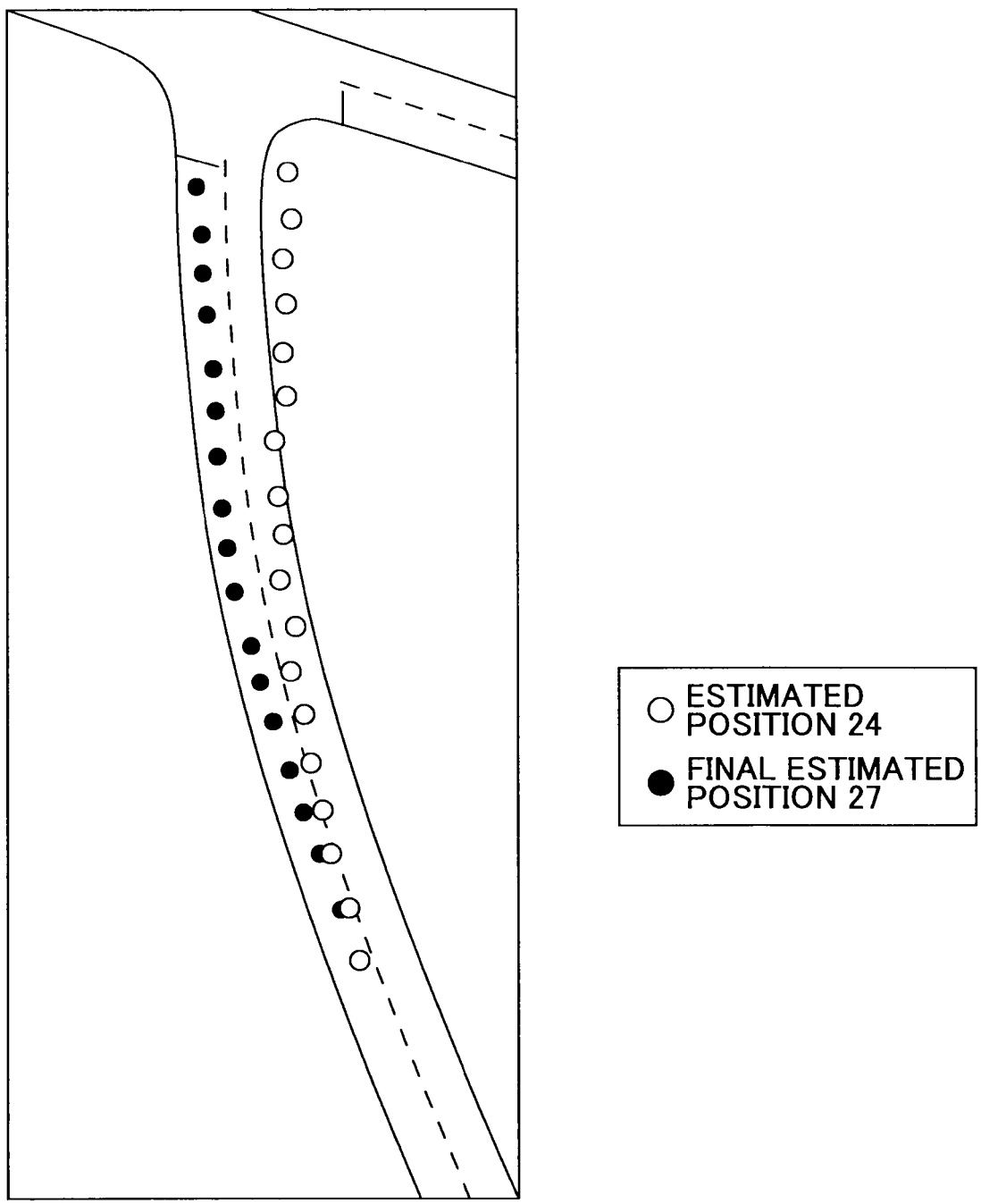
FIG. 8B is a diagram in which the estimated positions and the final estimated positions obtained by the autonomous navigation method are plotted on a photograph showing the plan view of an actual road.

FIG. 8B is a diagram in which the estimated positions 24 and the final estimated positions 27 obtained by the autonomous navigation method are plotted on a photograph showing the plan view of an actual road. The self-vehicle traveled from the bottom part toward the top part of the photograph of the plan view. As shown in FIG. 8B, as the vehicle travels, the estimated position 24 becomes more and more displaced from the actual road. However, by correcting the displacement with the planimetric feature estimated positions 26, the displacement from the road can be considerably reduced.

In the present embodiment, after the GPS waves are blocked, positions of landmarks such as traffic lights are detected in the course of correcting the position of the self-vehicle located by the autonomous navigation method. This is because the map DB 5 in a typical navigation system does not store position information of road infrastructure items (traffic lights, signs, etc.), as described above.

In order to provide driving assistance (vehicle control, attention calls) to the driver at intersections, etc., at appropriate timings, position information of road infrastructure items is indispensable. However, considerable workload and costs would be required for positioning the road infrastructure items nationwide and turning the information into a database. Furthermore, when a new road infrastructure item is installed, it cannot be immediately reflected in the database.

Thus, the positioning device 9 registers, in the map DB 5, positions of traffic lights, etc., detected in the course of correcting the position of the self-vehicle, and positions of traffic lights, etc., detected when the GPS waves are not blocked. Accordingly, a database of position information of road infrastructure items can be created.

Figure 9:
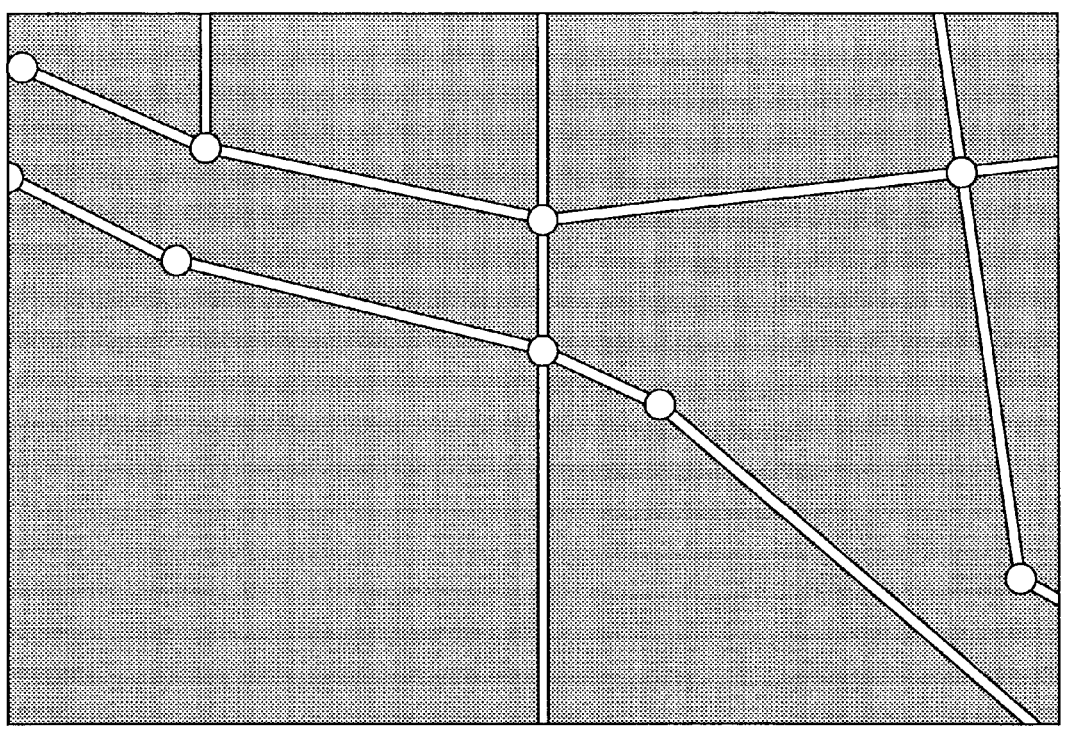
FIG. 9 shows an example of a map in which positions of traffic lights are registered in a road network obtained from map data.

FIG. 9 shows an example of a map in which positions of traffic lights are registered in a road network obtained from map data. The white circles indicate the registered traffic lights.

The positions of road infrastructure items can be detected by a camera installed in the vehicle quickly and at low cost. Thus, even if a new road infrastructure item is installed, this can be reflected in the database when the vehicle travels, thereby providing excellent redundancy.

As described above, in the positioning device 9 according to the present embodiment, the position of a planimetric feature such as a traffic light is identified, and the position of the self-vehicle is located by using the identified position of the planimetric feature as a reference. The position of the self-vehicle located in this manner and a position located by the autonomous navigation method are applied to the Kalman filter. Accordingly, the positioning results obtained by the autonomous navigation method can be accurately corrected even if the GPS waves are blocked. In particular, the position in the traveling direction can be accurately corrected. Furthermore, by registering the identified positions of planimetric features in a map database, the map database in which position information of road infrastructure items are registered can be updated during usage.

The present invention is not limited to the specifically disclosed embodiment, and variations and modifications may be made without departing from the scope of the present invention.

The present application is based on Japanese Priority Patent Application No. 2006-171755, filed on Jun. 21, 2006, the entire contents of which are hereby incorporated by reference.

The invention claimed is:

1. A positioning device comprising:
a map data storing unit configured to store map data;
an autonomous sensor configured to detect behavior information of a moving object;
an inertial positioning unit configured to detect an estimated position of the moving object by applying the behavior information detected by the autonomous sensor to positioning results obtained by an electronic navigation positioning unit;
a planimetric feature detecting unit configured to detect a planimetric feature located around a road, the planimetric feature detecting unit including an eye vector detecting unit configured to repeatedly detect the planimetric feature from image data obtained by a photographing unit, to repeatedly acquire an eye vector joining the moving object and the planimetric feature thus detected, and to repeatedly calculate a distance between the moving object and the planimetric feature thus detected;
a planimetric feature position identifying unit configured to identify a position of the planimetric feature detected by the planimetric feature detecting unit;
a planimetric feature reference positioning unit configured to estimate a planimetric feature estimated position of the moving object by using the position of the planimetric feature as a reference; and
a position estimating unit configured to estimate a position of the moving object, when the electronic navigation positioning unit is unable to receive data and a number of the eye vectors detected by the eye vector detecting unit and a number of distances calculated by the eye vector detecting unit are greater than or equal to a predetermined value, by applying an estimated position of the moving object when the electronic navigation positioning unit is first unable to receive data and the planimetric feature estimated position to a Kalman filter.

2. The positioning device according to claim 1, wherein:
the planimetric feature position identifying unit comprises a planimetric feature position calculating unit configured to calculate the planimetric feature position information of the planimetric feature by a least squares method with the use of lengths and directions of plural of the eye vectors.

3. The positioning device according to claim 2, wherein:
the planimetric feature position calculating unit extracts, from the map data storing unit, intersection position information corresponding to an intersection which is located within a predetermined distance from the planimetric feature, and sets the intersection position information as an initial value used for calculating the planimetric feature position information by the least squares method.

4. The positioning device according to claim 1, further comprising:
a map data registering unit configured to register the planimetric feature position information of the planimetric feature acquired by the planimetric feature position identifying unit, in the map data storing unit in association with the planimetric feature and a link or a node.

5. The positioning device according to claim 1, wherein:
when the electronic navigation positioning unit is unable to receive data and the number of the eye vectors detected by the eye vector detecting unit is less than the predetermined value, the planimetric feature detecting unit does not calculate the planimetric feature position information by the least squares method, and the position estimating unit outputs the estimated position.

6. The positioning device according to claim 1, wherein the behavior information detected by the autonomous sensor includes traveling distance and traveling direction of the moving object.

7. The positioning device according to claim 6, wherein the positioning results include a position and a direction of the moving object when the electronic navigation unit is first unable to receive data.

8. The positioning device according to claim 1, wherein the electronic navigation positioning unit is a GPS.

9. The positioning device according to claim 1, wherein the planimetric feature position identifying unit identifies the position of the planimetric feature by a least squares method using lengths and directions of the eye vectors, and
   wherein the planimetric identifying unit identifies the position of the planimetric feature by extracting, from the map data storing unit, intersection position information corresponding to an intersection which is located within a predetermined distance from the planimetric feature, and setting the intersection position information as an initial value used for performing the least squares method by a maximum grade method.

* * * * *